(12) United States Patent
Kiełczykowski et al.

(10) Patent No.: US 12,449,049 B2
(45) Date of Patent: Oct. 21, 2025

(54) CHECK VALVE FOR RAT RESTOW PUMP

(71) Applicant: Hamilton Sundstrand Corporation, Charlotte, NC (US)

(72) Inventors: Przemysław Kiełczykowski, Kiełczów (PL); Damian Adam Słodczyk, Wrocław (PL); Janusz Michał Sarosiek, Wrocław (PL); Piotr Michał Bereszyński, Głogów (PL); Tomasz Marek Skórka-Siemieński, Wrocław (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/584,375

(22) Filed: Feb. 22, 2024

(65) Prior Publication Data
US 2024/0287951 A1    Aug. 29, 2024

(30) Foreign Application Priority Data

Feb. 23, 2023    (EP) .................................... 23461520

(51) Int. Cl.
*F16K 15/04*    (2006.01)
*B64D 41/00*    (2006.01)
*F04B 53/10*    (2006.01)

(52) U.S. Cl.
CPC ........ *F16K 15/042* (2013.01); *F04B 53/1005* (2013.01); *F04B 53/1007* (2013.01);
(Continued)

(58) Field of Classification Search
CPC .. F04B 53/1007; F04B 53/109; F16K 15/042; F16K 15/044
See application file for complete search history.

(56) References Cited

U.S. PATENT DOCUMENTS 2,444,182 A * 6/1948 Calvin ................. F16K 15/042
                                                137/613
2,961,003 A * 11/1960 Shafer .................. F16K 11/074
                                                92/6 R
(Continued)

FOREIGN PATENT DOCUMENTS

EP    3865407 A1    8/2021
EP    4137725 A1    2/2023

OTHER PUBLICATIONS

European Search Report for Application No. 23461520.1, mailed Jul. 27, 2023, 9 pages.

*Primary Examiner* — Matthew Wiblin
(74) *Attorney, Agent, or Firm* — CANTOR COLBURN LLP

(57) ABSTRACT

A check valve assembly includes a housing having a fluid inlet arranged to be fluidly connected, in use, to a source of hydraulic fluid, a first stage body having a first stage fluid outlet and a second stage body having a second stage fluid outlet and a flow passage between the first and second stage bodies. The first stage body is a hollow body having a first end in fluid communication with the fluid inlet and housing a hollow first stage retainer around which is mounted a first stage spring that biases a first stage ball. The second stage body is a hollow body housing a second stage retainer around which is mounted a second stage spring that biases a second stage ball, and wherein a first stage pressure differential between the first stage fluid outlet and the fluid inlet creates a fluid flow path from the inlet outlet.

13 Claims, 3 Drawing Sheets

(52) U.S. Cl.
CPC .......... *F04B 53/109* (2013.01); *F16K 15/044* (2013.01); *B64D 41/007* (2013.01); *F04B 53/1015* (2013.01)

(56) References Cited

U.S. PATENT DOCUMENTS

| | | | |
|---|---|---|---|
| 3,824,043 A * | 7/1974 | Nordell | B66F 3/42 |
| | | | 417/440 |
| 3,910,313 A * | 10/1975 | Nordell | F04B 53/102 |
| | | | 137/625.23 |
| 5,601,345 A * | 2/1997 | Tackett | B60T 8/4031 |
| | | | 303/116.3 |
| 6,497,562 B1 | 12/2002 | Greiff et al. | |
| 8,043,186 B2 | 10/2011 | Gresley et al. | |
| 10,214,297 B2 | 2/2019 | Larson, Jr. et al. | |
| 2015/0118082 A1 | 4/2015 | Hembree | |
| 2016/0341225 A1* | 11/2016 | Bannon | F15B 15/204 |
| 2018/0200750 A1* | 7/2018 | Ramina | B05C 21/00 |

\* cited by examiner

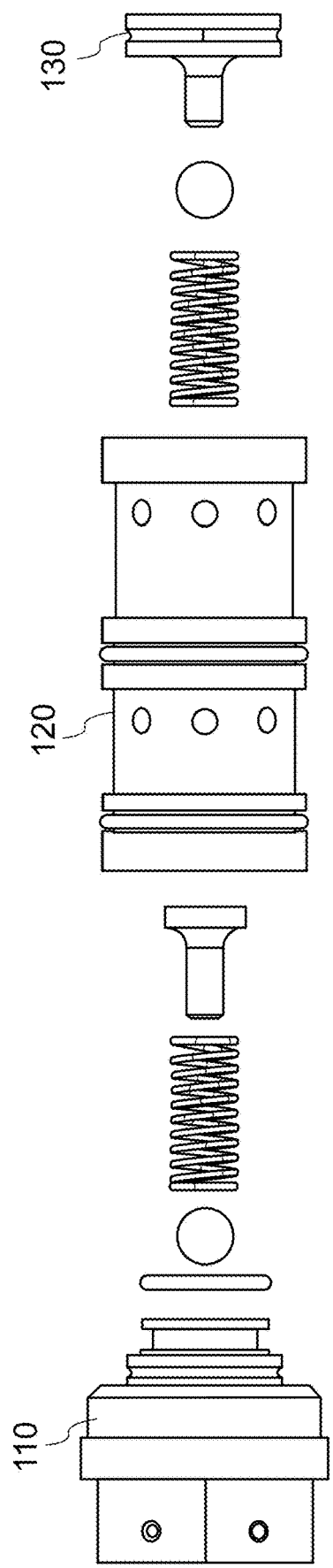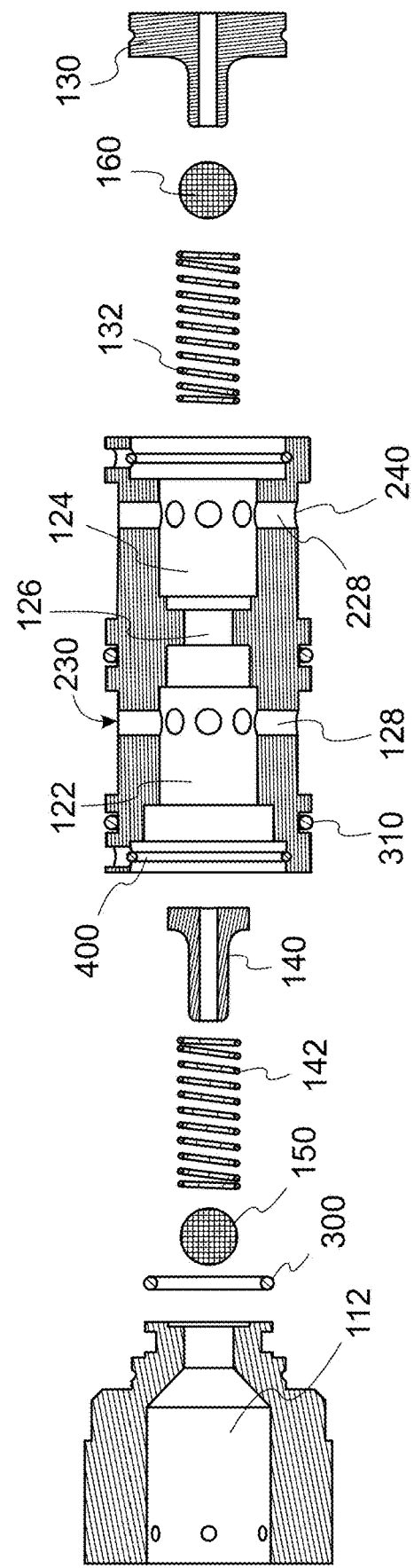

CHECK VALVE FOR RAT RESTOW PUMP

CROSS REFERENCE TO RELATED APPLICATIONS

This application claims priority to European Patent Application No. 23461520.1 filed Feb. 23, 2023, the entire contents of which is incorporated herein by reference.

TECHNICAL FIELD

The disclosure is concerned with a check valve for a pump assembly for retracting or re-stowing a ram air turbine, RAT, of an aircraft.

BACKGROUND

Ram air turbines, RATs, are small emergency turbines that may be provided in the fuselage or wing of an aircraft to be deployed in the case of failure of a main engine to provide emergency power. The RAT may be manually or automatically deployed, by means of a RAT actuator, into an airstream of the aircraft and rotates in the airstream to generate power for the aircraft. Once deployed, the RAT or RAT actuator is locked in the deployed position by a locking pin or mechanism to avoid the RAT being inadvertently pushed back into the retracted or stowed position by e.g. air forces. Typically, it is not possible to retract/re-stow the RAT during flight and the re-stowing is performed as a ground operation using a hydraulic re-stow pump assembly to provide hydraulic fluid to the RAT actuator to cause it to move in the re-stow direction.

A RAT actuator typically comprises a piston movably located within a hydraulic cylinder. To deploy the RAT, hydraulic fluid is provided to one side of the piston in the cylinder to extend the piston from the cylinder, the free end of the piston being connected to the RAT to deploy the RAT from the body of the aircraft where it has been stowed.

The re-stow pump is attached to the actuator assembly to provide hydraulic fluid to the cylinder on the other side of the piston to retract the piston back into the cylinder and thus to stow the RAT.

Typically, check valves are required in the re-stow pump assembly to avoid excessive pressure which can damage the actuator or the RAT. The check valves respond to excess pressure in the pump system by opening and recirculating fluid back to the pump fluid tank.

Current designs typically include two check valves each performing a different stage of operation, which are relatively expensive parts. There is a need for an improved check valve which is simpler and less expensive to manufacture and install.

SUMMARY

According to the disclosure there is provided a check valve assembly for a RAT re-stow pump. The assembly includes: a housing having a fluid inlet arranged to be fluidly connected, in use, to a source of hydraulic fluid, a first stage body having a first stage fluid outlet and a second stage body having a second stage fluid outlet and a flow passage between the first stage body and the second stage body, wherein the first stage body is a hollow body having a first end in fluid communication with the fluid inlet and housing a hollow first stage retainer around which is mounted a first stage spring that biases a first stage ball, and wherein the second stage body is a hollow body housing a second stage retainer around which is mounted a second stage spring that biases a second stage ball, and wherein a first stage pressure differential between the first stage fluid outlet and the fluid inlet creates a fluid flow path from the inlet to the first stage fluid outlet and causes the first stage ball to press against the bias of the first stage spring to close the flow passage between the first stage body and the second stage body, and wherein removal of the first stage pressure differential causes the first stage spring to return the first stage ball to its biased position to close the flow path from the fluid inlet to the first stage fluid outlet and to open the fluid passage between the first stage body and the second stage body and a second stage differential pressure between the fluid passage and the second stage outlet presses the second stage ball against the bias of the second stage spring to open a second stage fluid flow path between the fluid passage and the second stage fluid outlet.

BRIEF DESCRIPTION OF THE FIGURES

Examples of the check valve assembly according to the disclosure will now be described in detail with reference to the drawings. It should be noted that these are examples only and that variations are possible within the scope of the claims.

FIG. 3 is an exploded view of a check valve assembly according to the disclosure.

FIG. 4 is a cross-sectional view of the assembly shown in FIG. 3.

DETAILED DESCRIPTION

Figure 1:
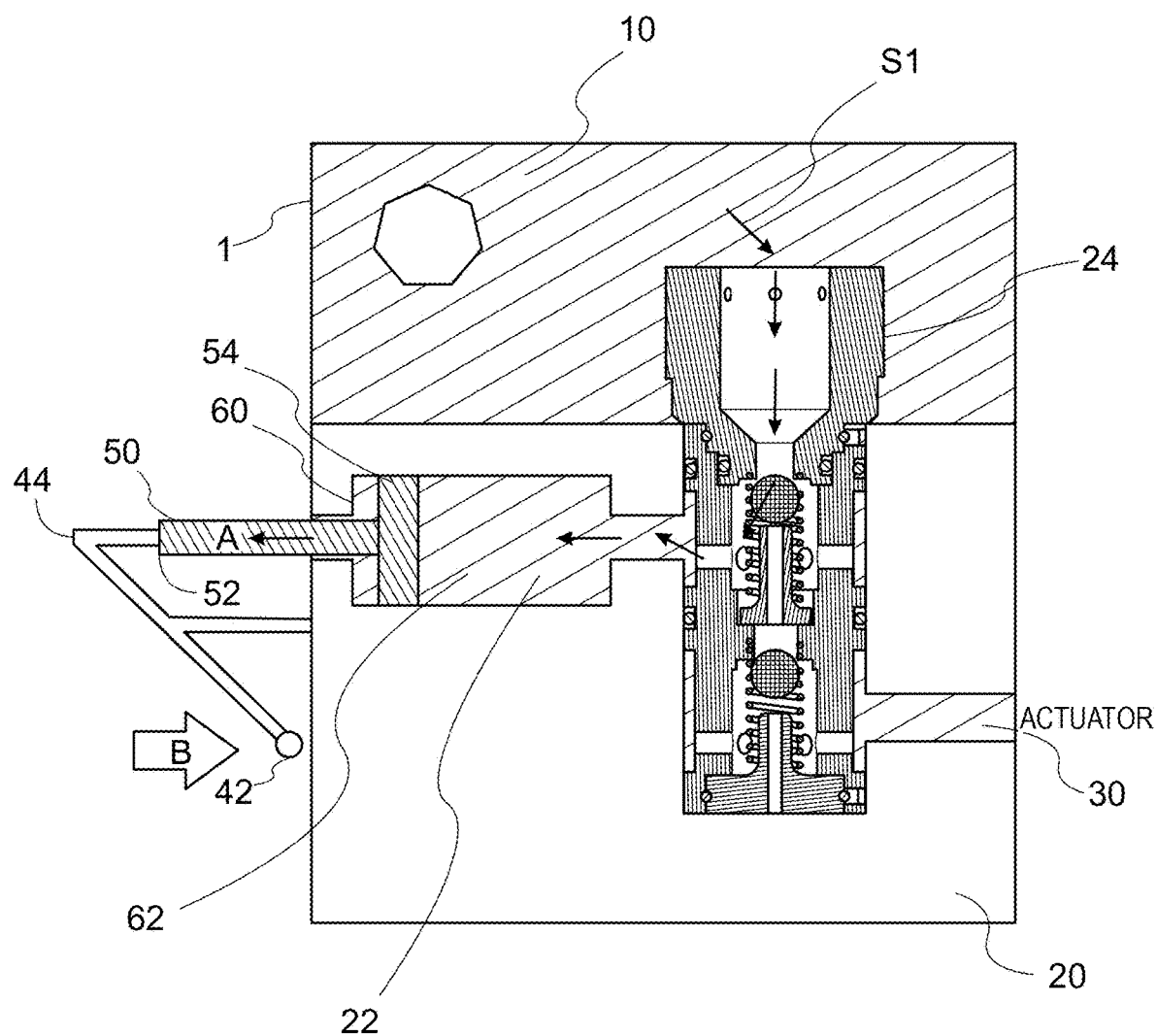
FIG. 1 is a schematic view showing a first stage of operation of a check valve assembly according to the disclosure in a re-stow pump.

Referring first to FIG. 1, a re-stow pump is shown within which is provided a check valve according to this disclosure. The pump has a pump housing 1 containing a tank 10 storing hydraulic fluid and a valve housing 20 which houses the pump valve assembly including the pump actuator 22 and the check valve 24, the check valve 24 being connected between the tank 10 and an outlet 30 to the RAT actuator. The RAT actuator and other features of the RAT will not be described here as these are known in the art and do not form part of this disclosure.

A pump operating lever 40 extends out from the pump housing 1 for operation by the ground crew to re-stow the RAT. The lever 40 has a free end 42 and an opposite end connected in a cantilevered manner to a free end 52 of a piston 50 of the pump. The other end of the piston defines a piston head 54 movably located in a pump cylinder 60. The cantilevered form of the lever is just one example, and a simple push-pull lever (which would then operate in the opposite direction to that described below) can also be used.

Without the check valve, operating the lever 40 would push the piston 50 to move the piston head 54 along the cylinder to press fluid, from the tank, to the outlet and to the RAT actuator to move the RAT actuator piston in the stow direction. The check valve is located in the fluid path in the re-stow pump to prevent over-pressurization, as described further below.

In a first stage (shown in FIG. 1 and described further below), the pump lever 40 is operated to draw the pump piston head along the cylinder 60 in a direction A towards the pump housing. In the example shown, this is done by pressing or pushing the free end 52 of the lever 50 towards the pump housing in direction B. With a simple, non-cantilevered lever, the direction of operation would be in direction A.

As the piston head is drawn along the cylinder in direction A, fluid is drawn from the tank 10 through the check valve (further described below) into the piston chamber 62, as shown by arrows S1. The fluid collects in the chamber 62 until the piston reaches the end of its stroke. The pressure differential across the check valve causes the check valve to close off the flow from the tank (again as will be described further below).

Figure 2:
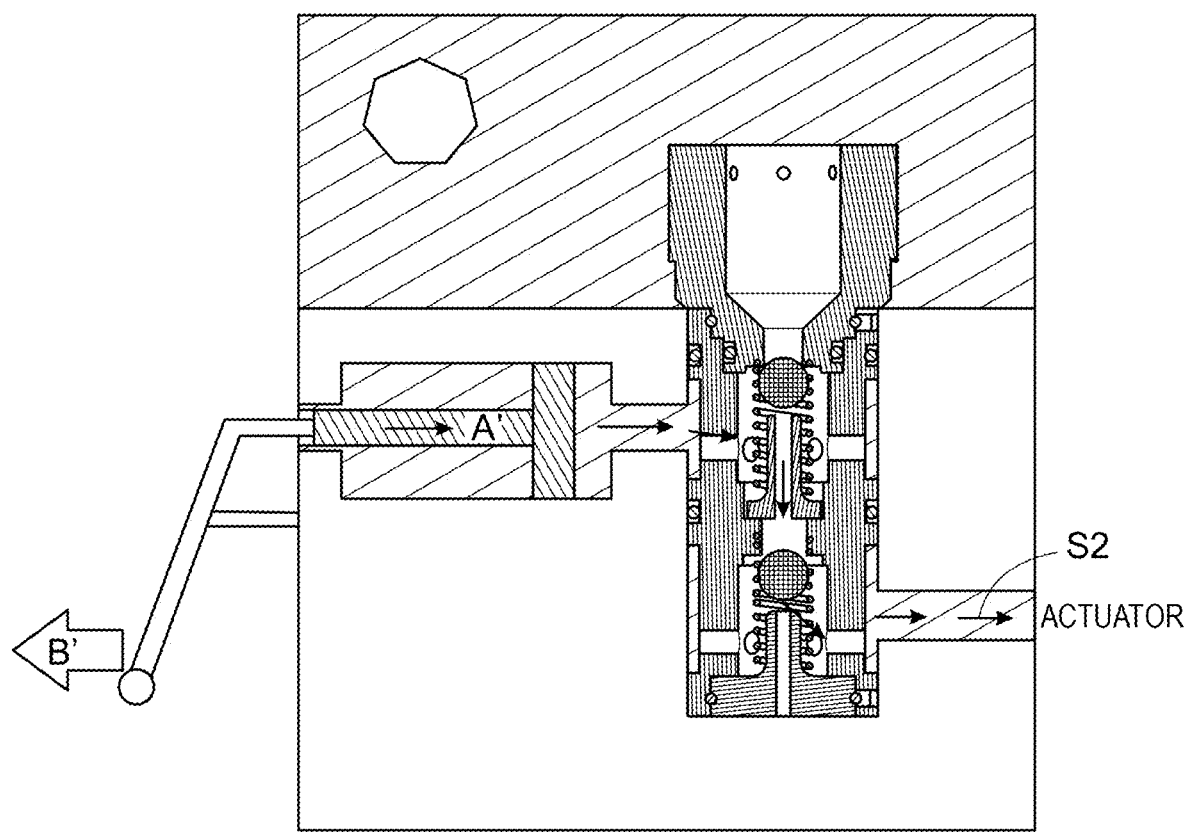
FIG. 2 is a schematic view showing a second stage of operation of a check valve assembly as shown in FIG. 1.

In the second stage of the pump operation, as shown in FIG. 2, the lever is operated in the opposite direction (here B') which acts on the piston 50 to push the piston back into the piston chamber 62 (direction A') such that the piston head 54 forces the fluid that has collected in the chamber in the first stage (FIG. 1) through the check valve now in its second stage position (described further below) in the direction of arrows S2 to and through the outlet 30 to the RAT actuator to cause the RAT actuator to stow the RAT.

The parts making up the two-stage check valve of the disclosure that enable the above-described two-stages of operation using a single check-valve assembly, will be described further with additional reference to FIGS. 3 and 4.

The check valve assembly 100 comprises a housing formed of an inlet port housing part 110 through which a fluid inlet port 112 extends, a main housing part 120, and an end retainer 130. When assembled, the main housing part 120 is terminated at one end with the inlet port housing part 110, via which fluid enters the check valve from the tank 10, and at the other end with the end retainer 130 which provides a closed end of the check valve. The housing defines an axis X from the inlet port housing part, through the main housing part and to the end retainer.

The main housing part 120 defines a first stage body 122 and a second stage body 124 fluidly connected by a flow passage 126. The first stage body 122 is a hollow body in fluid connection with the inlet port and is provided with flow outlets 128 leading from the first stage body to openings 230 in the main housing part 120. A hollow top retainer 140 located within the first stage body 122. A first stage spring 142 is mounted around the top retainer 140 and axially biases a first stage ball 150 relative to the top retainer as will be described further below.

The second stage body 124 is similar (but mirror image, to the first stage body) and housing a second stage ball 160 biased relative to the end retainer 130 by a second stage spring 132. Similar to the first stage body 122, the second stage body includes fluid passages or outlets 228 from the hollow interior to openings 240 in the main housing body part.

Seals 300, 310 may be provided within and around the outside of the check valve.

In the example shown, a safety wire 400 is also provided around the ends of the main housing part. This can be used to prevent the threaded connection between the housing parts becoming loose e.g. due to vibration.

As the main housing part is open at both ends, the components described above can be easily assembled from both ends.

The first and second stages of operation of the check valve, briefly described above with reference to FIGS. 1 and 2, can now be explained in more detail with reference to FIGS. 3 and 4.

In the first stage of operation, as the lever is operated to move the piston head 54 in the retraction direction A, fluid is drawn from the tank 10 into the check valve at the inlet port 112 due to the pressure difference caused by drawing the head 54 through the chamber 62. The pressure of the fluid (e.g. oil or other hydraulic fluid) being drawn from the tank 10 pushes against the first stage ball 150 against the force of the first stage spring 142 moving the first stage ball towards the top retainer such that the retainer moves axially past the first stage flow passages 128 opening a flow path through those passages and the first stage openings 130 and the retainer is positioned to block the flow passage 126 between the first and second stage bodies. All fluid flow is therefore directed from the tank, via the first stage body, into the pump piston chamber 62 until the piston reaches the end of its stroke in that direction. Once the flow from the tank 10 stops, because the piston has reached the end of its stroke and the pressure difference between the chamber 62 and the inlet port no longer allows the fluid to flow from the tank, the force of the first stage spring acts to move the first stage ball back towards the inlet port to seat at the inlet port and to close the flow path from the tank to the check valve. At this stage, the fluid is held in the chamber 62.

In the second stage of operation (FIG. 2), the lever is operated to push the piston head back into the chamber 62 forcing the collected fluid back into the first stage passages of the check valve. The first stage ball remains forced into seating engagement with the inlet port and so the fluid is forced to flow through the hollow top retainer. This then presses against the second stage ball 160 against the biasing force of the second stage spring 132 thus opening the passage 126 between the first and second stage bodies allowing the fluid to flow into the second stage body and out through the second stage passages 228 and openings 240 from where it flows through the outlet to the RAT actuator.

This completes one full cycle of collecting the appropriate amount of fluid from the tank (first stage) and ejecting that fluid to the RAT actuator (second stage), both of which are conveniently and simply performed with a single check valve assembly.

Once the piston has reached the end of its ejection stroke and has forced all of the collected fluid from the chamber 62, the second stage ball is able to return to its positioning closing the passage 126, due to the bias of the second stage spring 132.

The check valve is therefore returned to its start position for further cycles of pump operation.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A check valve assembly comprising:
a housing having a fluid inlet arranged to be fluidly connected, in use, to a source of hydraulic fluid;
a first stage body having a first stage fluid outlet and a second stage body having a second stage fluid outlet and a flow passage between the first stage body and the second stage body,
wherein the first stage body is a hollow body having a first end in fluid communication with the fluid inlet and housing a hollow first stage retainer around which is mounted a first stage spring that biases a first stage ball;
wherein the second stage body is a hollow body housing a second stage retainer around which is mounted a second stage spring that biases a second stage ball;
wherein a first stage pressure differential between the first stage fluid outlet and the fluid inlet creates a fluid flow path from the fluid inlet to the first stage fluid outlet and causes the first stage ball to press against a bias of the first stage spring to close the flow passage between the first stage body and the second stage body;
wherein removal of the first stage pressure differential causes the first stage spring to return the first stage ball to its biased position to close the flow path from the fluid inlet to the first stage fluid outlet and to open the flow passage between the first stage body and the second stage body; and
wherein a second stage differential pressure between the flow passage and the second stage fluid outlet presses the second stage ball against a bias of the second stage spring to open a second stage fluid flow path between the flow passage and the second stage fluid outlet.

2. The check valve assembly of claim 1, wherein the first stage fluid outlet comprises a fluid passage extending from an interior of the first stage body, the passage fluidly communicating with first stage openings in the first stage body, and wherein the second stage fluid outlet comprises a fluid passage extending from an interior of the second stage body, the passage fluidly communicating with second stage openings in the second stage body.

3. The check valve assembly of claim 2, further comprising:
seals provided between parts of the check valve assembly.

4. The check valve assembly of claim 1, wherein the housing is provided with inner threads at each of the first end and an opposing second end.

5. The check valve assembly of claim 4, further comprising a safety wire around an exterior of each of the first and second ends.

6. A pump unit comprising:
a pump housing containing a tank of fluid and having an outlet port via which the fluid from the tank exits the pump unit; and
the check valve assembly as claimed in claim 1 arranged between the tank and the outlet port to regulate flow of the fluid from the tank to the port.

7. The pump unit of claim 6, further comprising:
a pump actuator which cooperates with the check valve assembly to regulate the fluid flow.

8. The pump unit of claim 7, wherein the pump actuator comprises a piston and a piston cylinder within which the piston moves between a retracted position and an extended position relative to the cylinder, and
whereby, in a first stage of pump operation, the piston is retracted to draw the fluid from the tank into the cylinder via the first stage body of the check valve assembly and the second stage body of the check valve assembly is in a closed state, and, in a second stage of operation, after the first stage of operation, the piston is extended relative to the cylinder to eject the fluid from the cylinder to the outlet port via the second stage body of the check valve assembly while the first stage body of the check valve assembly is in a closed state.

9. The pump unit of claim 8, wherein the closed state of the first stage body comprises the first stage ball being forced into sealing engagement with the flow passage between the first stage body and the second stage body, and the closed state of the second stage body comprises the second stage ball being forced into sealing engagement with the flow passage between the first stage body and the second stage body.

10. The pump unit of any of claim 9, further comprising a pump lever having a first end extending out of the pump housing for actuation by a user and a second end connected to the piston, such that movement of the lever moves the piston between the retracted and the extended positions.

11. A ram air turbine (RAT) actuator assembly comprising:
a RAT actuator; and
the pump unit as claimed in claim 6, wherein the RAT actuator is connected to the outlet port.

12. A ram air turbine (RAT) assembly comprising:
a RAT; and
the RAT actuator assembly as claimed in claim 11, arranged to stow the RAT.

13. An aircraft having the RAT assembly as claimed in claim 12.

* * * * *